United States Patent [19]

Horst

[11] Patent Number: 5,530,307
[45] Date of Patent: Jun. 25, 1996

[54] FLUX CONTROLLED PERMANENT MAGNET DYNAMO-ELECTRIC MACHINE

[75] Inventor: Gary E. Horst, Manchester, Mo.

[73] Assignee: Emerson Electric Co., St. Louis, Mo.

[21] Appl. No.: 219,077

[22] Filed: Mar. 28, 1994

[51] Int. Cl.[6] .................... H02K 21/12; H02K 21/14; H02K 21/04
[52] U.S. Cl. .............................. 310/156; 310/181
[58] Field of Search ................ 310/44, 164, 168, 310/156, 181

[56] References Cited

U.S. PATENT DOCUMENTS

| | | | |
|---|---|---|---|
| 2,796,542 | 6/1957 | Bekey et al. | 310/162 |
| 3,411,027 | 11/1968 | Rosenberg | 310/181 |
| 4,654,551 | 3/1987 | Farr | 310/112 |
| 4,757,224 | 7/1988 | McGee et al. | 310/181 |
| 4,766,362 | 8/1988 | Sadvary | 322/50 |
| 4,916,346 | 4/1990 | Kliman | 310/156 |
| 5,177,391 | 1/1993 | Kusase | 310/263 |

*Primary Examiner*—Clayton E. LaBalle
*Attorney, Agent, or Firm*—Polster, Lieder, Woodruff & Lucchesi

[57] ABSTRACT

A brushless, permanent magnet dynamo-electric machine (50) has a stator assembly (52) and a rotor assembly (RA). The rotor assembly includes a rotor (R) mounted on a rotor shaft (RS). The stator assembly has a plurality of inwardly salient poles (54) and the rotor has a plurality of outwardly salient poles (RP). The rotor is comprised of a plurality of stacked rotor laminations (L) defining the rotor poles, and there is an air gap (G1) between the rotor and stator poles. An improvement (56) of the present invention controls the available flux coupled between the rotor and stator assemblies. A coil (70) is supported on a magnetic mounting structure (66) which is connected to an endwall (W) of the motor housing and fits the coil over the rotor shaft. D.C. current is supplied to the coil. A plurality of magnets (82a, 82b) extend the length of the lamination stack and the magnets are positioned adjacent an outer face of one pole for each set of rotor poles. The magnets are mounted on support structure (72) that extends about the coil. The magnets magnetically attach to the outer surface of the rotor poles to suspend the structure about the shaft. An air gap (G2) extends between the coil and shaft. The magnets rotate in synchronism with the rotor. The current supplied to the coil controls the flux coupled to the rotor, and the mounting structures for the coil and magnets partially define a diversion flux path for the resultant flux.

14 Claims, 2 Drawing Sheets

FLUX CONTROLLED PERMANENT MAGNET DYNAMO-ELECTRIC MACHINE

BACKGROUND OF THE INVENTION

This invention relates to dynamo-electric machines such as electric motors generator and the like and, more particularly, to a method of controlling flux in a brushless permanent magnet (BPM) motor or generator.

In permanent magnet motors and generators, there is a constant level of flux which is fixed by magnets comprising part of the motor or generator assembly. This is significant because, for example, if the motor or generator has a certain level of torque at a certain speed or range of operating speeds, the motor or generator must be specifically designed to properly function with this set of operating requirements. Thus, if the motor is to have constant torque at high speeds, the motor may have fewer turns in its armature. If there are fewer turns, there is correspondingly a higher current level which must be accommodated by an inverter doing the switching between motor phases. That is, the inverter will need switching elements having greater current carrying capacity. This increases the cost of the inverter. It would be advantageous in brushless permanent magnet motors (or generators) to provide a flux control capability by which phase switching in the motor or generator can be accomplished by a converter of conventional design. This also produces a more efficient dynamo-electric machine.

One approach to doing this could be based upon the dynamo-electric machine disclosed by Bekey and Robinson in their U.S. Pat. No. 2,796,542. As taught by Bekey and Robinson, machine flux is controllable by defining a specific, isolated rotor pole structure. This results in a magnetic circuit which produces a particular set of motor operating characteristics. However, to use an approach based on this machine design would require improvements in machine efficiency.

An enhanced flux control capability for use in motors has an application in appliances; for example, in washing machines. These are typically high speed, low torque applications of a BPM motor. To achieve high speed, low torque, so many turns have to be taken out of the motor that sufficient current cannot be achieved at low speed, high torque motor conditions to provide efficient operation. This problem can be recitified by changing the design of the inverter used with the motor but there are costs and other penalties associated with doing so.

As a generator, a flux controlled dynamo-electric machine has certain advantages over the Lundell type alternator or generator presently used in automobiles. With the ever increasing enhancements in automobiles, both with respect to performance and passenger comfort, there is a need for an alternator capable of supplying more electricity than the current type alternators are able to provide. A particular problem in this area, of course, is that the generator output must be constant over a wide range of generator operating speeds. A flux controllable machine, used with appropriate microprocessor or similar controls could fulfill the current requirements regardless of how fast the generator is running.

SUMMARY OF THE INVENTION

Among the several objects of the present invention may be noted the provision of an improved permanent magnet dynamo-electric machine; the improvement of such a machine which is a brushless machine; the provision of such an improvement in which machine flux is controllable to produce a desired set of machine operating characteristics; the provision of such an improvement which is based on a machine design such as taught by Bekey and Robinson in their U.S. Pat. No. 2,796,542; the provision of such an improvement including a rotor assembly in which pole face losses for at least some of the rotor poles are significantly reduced; the provision of such an improvement having permanent magnets installed between rotor poles with the magnets being constrained so as to remain in their positions relative to the poles even when the machine is operating at high speed; the provision of such an improvement in which the magnets magnetically attach to the rotor poles so a mounting structure to which the magnets are affixed is suspended about the rotor shaft with an air gap being formed between the mounting structure and the shaft; the provision of such an improvement by which attachment of the magnets is to one pole of each set of rotor poles thereby to produce a consequent rotor assembly; the provision of such an improvement to further mount a stationary coil adjacent the rotor and the magnets; the provision of such an improvement by which the mounting structure for the magnet is suspended about the rotor shaft so an air gap is formed therebetween, this air gap, together with that between the rotor shell producing an isolated flux path for flux produced when current is supplied to the coil; the provision of such an improvement which is more efficient dynamo-electric machine than a Bekey-Robinson machine; and, the provision of such an improvement to produce motors and generators usable in a wide speed range of applications including appliance and automotive applications.

In accordance with the invention, generally stated, a brushless, permanent magnet dynamo-electric machine has a stator assembly and a rotor assembly. The rotor assembly includes a rotor mounted on a rotor shaft. The stator assembly has a plurality of inwardly salient poles and the rotor has a plurality of outwardly salient poles. The rotor is formed by a plurality of stacked rotor laminations defining the rotor poles, and there is an air gap between the rotor and stator poles. An improvement of the present invention controls the available flux coupled between the rotor and stator assemblies. A coil is installed on a magnetic mounting fixture attached to an end wall of the machine so the coil is fitted about the rotor shaft. An air gap is formed therebetween. A d.c. current is supplied to the coil. A plurality of magnets are mounted on a fixture extending the length of the lamination stack and the magnets are positioned adjacent an outer face of one pole, e.g. the north pole, of each set of rotor poles. Each magnet magnetically attaches to the corresponding rotor pole to produce a consequent pole structure. The magnets are suspended about the rotor shaft and rotate in synchronism with the rotor. Suspension of the magnet's fixture about the shaft creates a third air gap. The current supplied to the coil controls the flux coupled to the rotor, and the respective mounting structures, for the coil and magnets to partially define a flux path for the flux diverted from the stator flux. The machine is usable either as a motor in appliance applications and as a generator in automotive applications. Other objects and features will in part be apparent and in part pointed out hereinafter.

BRIEF DESCRIPTION OF THE DRAWINGS

Corresponding reference characters indicate corresponding parts throughout both drawings.

DESCRIPTION OF A PREFERRED EMBODIMENT

Figure 1:
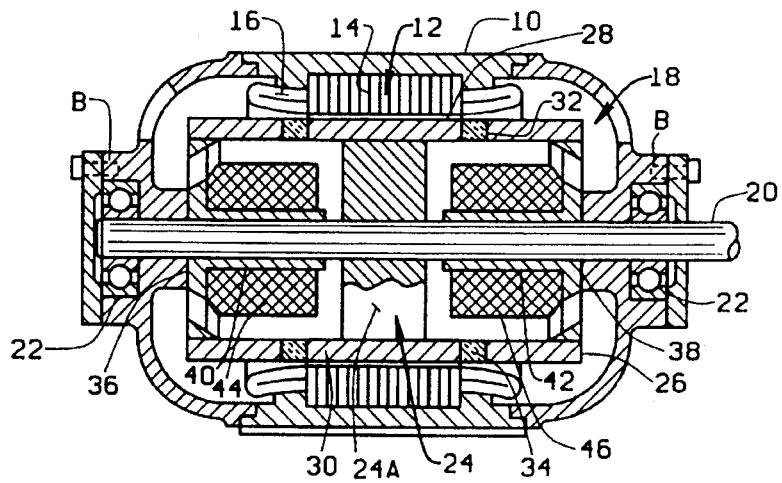
FIG. 1 is a sectional view of a prior art Bekey-Robinson type dynamo-electric machine.

Referring to the drawings, FIG. 1 is a sectional view of a prior art Bekey-Robinson type dynamo-electric machine as taught in their U.S. Pat. No. 2,796,542. In accordance with their teachings, a machine 10 includes a stator 12 comprised of laminations 14 and an associated stator winding 16. A rotor assembly 18 includes a rotor shaft 20 supported at each end by respective bearing assemblies 22 which are installed in machine end brackets B. A magnetic spider 24 is centrally supported on shaft 20. The spider supports a field tube 26 which is concentric with the rotor shaft and extends longitudinally of the shaft in both directions from the spider. Pole forming inserts 28, 30 are located at opposite ends of a spider arm 24A. The inserts are segments of tube 26, and are magnetically isolated from the tube by respective non-magnetic inserts 32, 34 which surround the pole forming inserts. Yokes 36, 38 are mounted inwardly of the respective end brackets. Each yoke has an inwardly projecting tubular extension 40, 42 on which are mounted respective field coils 44, 46 to which are supplied a d.c. current.

Flux transfer is across the air gap between the shaft and the tubular extensions of the yokes. The flux produced in shaft 20 at spider 24 by one of the field coils is axially opposed by the flux produced in the spider by the other field coil. The field coils further produce a flux in the spider which has a flux path through arm 24A, the inserts 28, 30, across the air gap between the inserts and stator laminations, through the laminations, across the air gap between the stator laminations and that portion of tube 26 outside the non-magnetic inserts, and across the air gap between the field tube and the respective yokes 36, 38.

Figure 2:
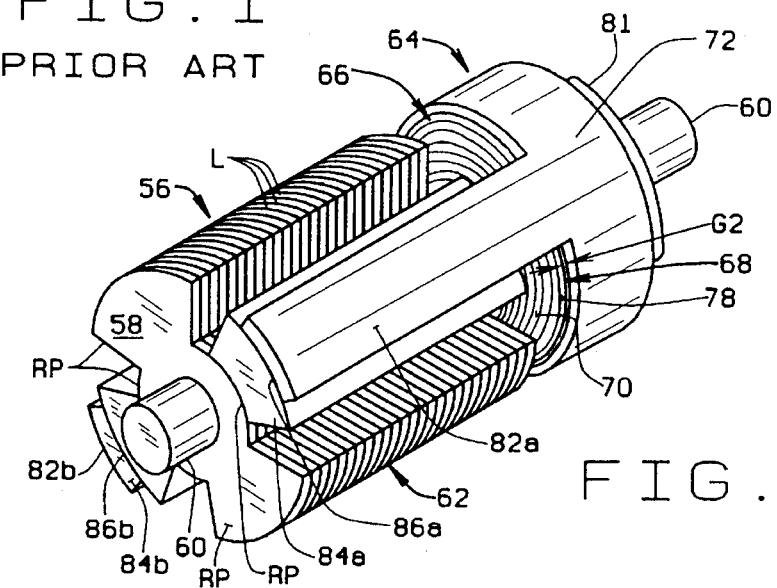
FIG. 2 is a perspective view of a rotor assembly of a brushless permanent magnet motor or generator of the present invention.
Figure 3:
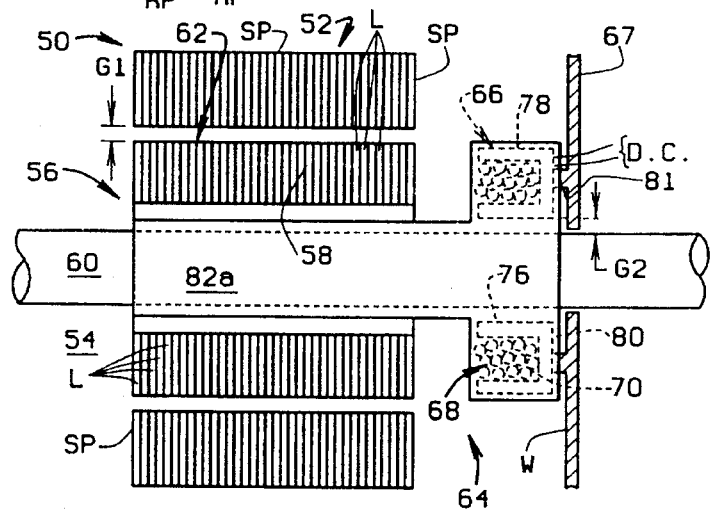
FIG. 3 is a side elevational view of the rotor assembly of FIG. 2 illustrating the fixed coil and movable magnet structure of the invention.

An improvement of the present invention for controlling flux in a brushless, permanent magnet dynamo-electric machine is indicated generally 50 in FIG. 3. The machine includes a stator assembly indicated generally 52, the stator assembly having a central bore 54 and a plurality of inwardly salient teeth forming stator poles SP. A rotor assembly 56 includes a rotor 58 mounted on a rotor shaft 60 for rotation with respect to the stator assembly. The rotor is comprised of a plurality of rotor laminations L stacked together to form a rotor lamination stack indicated generally 62. The stack of lamination define a plurality of outwardly salient rotor poles RP. There is an air gap G1 between the respective rotor and stator poles when the poles are aligned as represented in FIG. 3. While the rotor construction shown in the drawings is for a four-pole rotor, it will be understood that other rotor constructions may have a different number of poles without departing from the scope of the invention. As shown in FIGS. 2 and 3, the rotor pole construction is such that there are two sets of rotor poles each of which would include a north pole and a south pole.

Figure 4:
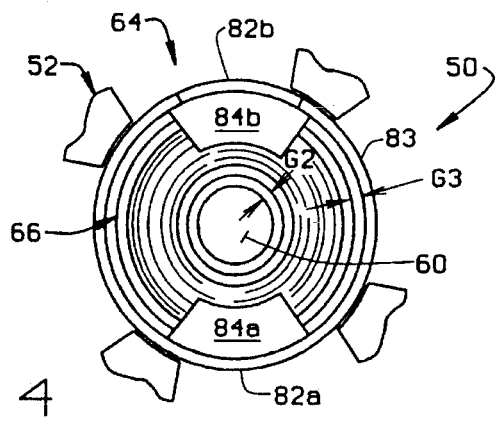
FIG. 4 is an end elevational view of a cylinder or sleeve which fits over a rotor shaft and is used to mount magnets and a mounting fixture for the coil.

Improvement 50 further includes means 64 for controlling the available flux coupled between rotor assembly 56 and stator assembly 52. Means 64 first includes an annular housing or fixture 66 which is attached to an inner wall or face W of an end shield 67 of the machine. The fixture, as shown in FIG. 4, has an inner diameter (i.d.) which is greater than the diameter of the rotor shaft for an air gap G2 to be formed between the fixture and shaft. When installed, the fixture sleeve is positioned to one side (the right side as viewed in FIG. 3) of the rotor lamination stack. A coil means 68 comprises a stationary, wound coil 70 to which a d.c. current is supplied. Housing 66 extends circumferentially about shaft 60 for housing the coil. The housing has an inner annular wall 76 spaced radially outwardly from the rotor shaft and an outer annular wall 78. A rear wall 80 of the housing forms an end closure for one end of the housing. The other end of the housing is open for insertion of the coil into the housing.

When installed over the rotor shaft, the open end of the housing faces the rotor lamination stack. An annular support or base 81 is formed on end wall 80 and the base is attached to wall W of the machine housing to support housing 66 and coil 70 in place.

Next, means 56 includes a second fixture 72 having finger or legs 82 which extend longitudinally of and parallel to the rotor shaft. There are the same number of fingers as there are rotor pole sets. Since rotor assembly 56 has two sets of poles, there are two fingers 82a, 82b. The fingers are formed at the open end of housing 72. The fingers are opposed fingers which extend from an annular ring 83 which fits about housing 66. A space G3 between housing 66 and ring 83 comprises a third air gap within the machine. Respective magnets 84a, 84b are attached to the inner surfaces 86a, 86b of the fingers. Magnets 84a, 84b, comprise magnet means mounted adjacent to the rotor and rotatable therewith.

The magnets are secured to the fingers so to be positioned adjacent an outer surface of one the respective poles of each pole set. Thus, the magnets have an arcuate shape corresponding to that of the respective pole surfaces. The arc subtended by each magnet corresponds to that subtended by the poles against which the magnets are positioned. The fingers 82a, 82b have a corresponding arcuate shape; although, the arc subtended by the fingers is less than that of the rotor pole and magnets. Importantly, by positioning the magnets adjacent the rotor poles, the magnets magnetically attach themselves to the poles. This produces a number of advantageous results.

First, the magnetic attachment produces a consequent rotor assembly in which each of the poles formed by the lamination stack is now the same type pole. As indicated in FIG. 2, all the poles formed by the lamination stack are now south poles. The north pole for each set of rotor poles is formed by the respective magnets 82a, 82b. For this consequent assembly, the pole face losses for the poles to which the magnets attach are significantly reduced. Since one-half of the poles will have an attached magnet, in poles, regardless of the number of poles in the assembly will be reduced.

Second, with the magnets attached to the rotor assembly, the ring and fingers will be suspended about the rotor shaft and coil housing such the air gap G3 is formed between the ring and coil housing. Thus, there is no need for any other type of attachment by which fixture 72 is positioned relative to the rotor assembly, rotor shaft, and coil housing. In addition, the housing, sleeve and fingers can be formed of a highly permeable powdered metal which is pressed or otherwise formed to provide a sturdy and stable support for mounting the coil and magnets, and doing so such that the ring and fingers are supported against the centrifugal forces produced when the dynamo-electric machine is operating at speed.

Figure 6A:
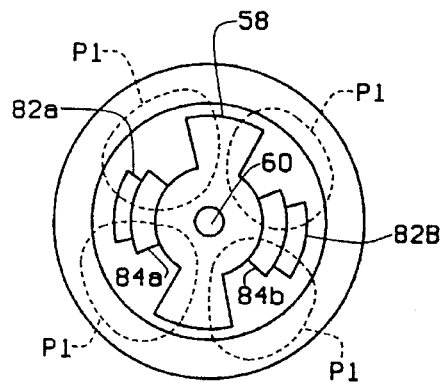
FIG. 6A is a sectional view of the machine illustrating primary flux paths; and, FIG. 6B is a sectional view of the rotor and stator assemblies illustrating diverted flux paths through the machine.
Figure 5:
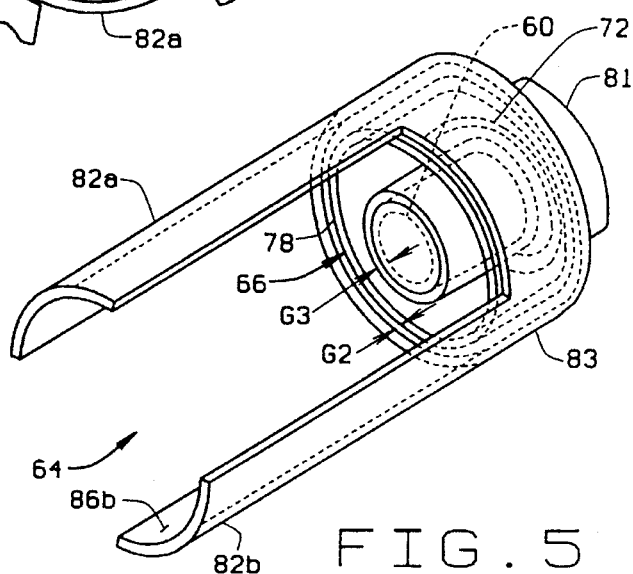
FIG. 5 is a perspective view of the cylinder of sleeve and coil mounting fixture.
Figure 6B:
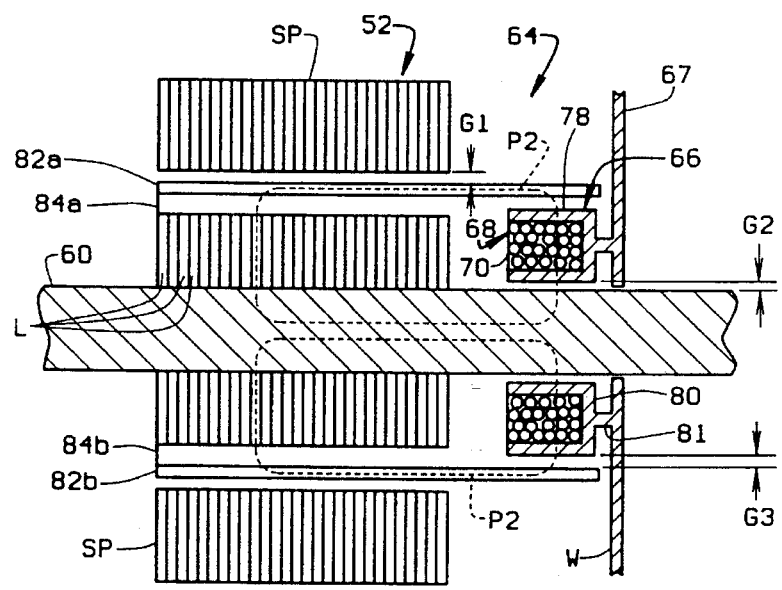

As noted, d.c. current is supplied to coil 70. The current supplied to the coil controls the flux coupled to the rotor. Now, and as shown in FIGS. 6A and 6B, the sleeve partially defines a flux path for the resultant flux. Two flux paths P1 and P2 are indicated by the dashed lines in FIGS. 6A and 6B. The flux paths, as in the Bekey-Robinson construction, are isolated flux paths. In FIG. 6A, a flux path P1 extends through the rotor poles, the magnets and fingers, across air gap G1, through the stator laminations, and back. In FIG. 6B flux from coil 70 bridges air gap G2 between housing 66 and rotor shaft 60. The flux is transmitted through the rotor shaft to the rotor lamination stack 62. The flux flows through the rotor laminations, the magnets and the fingers 82. After flowing through the fingers, the flux path bridges air gap G3 and flows through housing 66 back to the coil. As is seen, therefore, while the machine construction is based upon the Bekey-Robinson design, it is an improvement over that construction. In particular, the improvement of the present invention; i.e., the mounting of the coils and magnets, suspension of the sleeve about the shaft, and control of flux through control of current application to the coil makes it possible to reduce machine torque, particularly at high speed. Further, the current requirements for the motor are reduced. The diverted flux of path P2 can either additively or operatively combine with the flux through path P1 depending upon the direction of current flow through the coil. Thus, machine flux is controlled by controlling current flow.

What has been described is an improved permanent magnet dynamo-electric machine which is a brushless dynamo-electric machine. Machine flux is controllable to produce a desired set of machine operating characteristics. The machine construction is an improvement over the dynamo-electric machine design taught by Bekey and Robinson in their U.S. patent. The improved construction includes a consequent rotor assembly in which pole face losses for at least some of the rotor poles are reduced by one-half. This is accomplished by installing permanent magnets adjacent certain rotor poles, the magnets being constrained so as to remain in their positions relative to the poles even when the machine is operating at high speed. Further, the magnetic attraction between the magnets and the machine's rotor assembly suspend a magnet and a coil assembly about a rotor shaft. This, in turn, produces an isolation similar to that formed in the Bekey-Robinson design, this isolation being provided by the three air gaps formed in the machine. One air gap is between the rotor poles and stator poles, a second between a coil housing and rotor shaft, and a third between the coil housing and a magnet holding fixture. The result is a highly efficient flux controlled dynamo-electric machine usable in a wide range of motor and generator applications.

In view of the foregoing, it will be seen that the several objects of the invention are achieved and other advantageous results are obtained.

As various changes could be made in the above constructions without departing from the scope of the invention, it is intended that all the matter contained in the above description or shown in the accompanying drawings shall be interpreted as illustrative and not in a limiting sense.

Having thus described the invention, what is claimed and desired to be secured by Letters Patent is:

1. In a brushless, permanent magnet dynamo-electric machine having a stator assembly and a rotor assembly, the rotor assembly including a rotor mounted on a rotor shaft for rotation with respect to the stator assembly, the stator assembly having a plurality of inwardly salient stator poles and the rotor having a plurality of outwardly salient rotor poles, there being an air gap between the respective rotor and stator poles when the poles are aligned, and a flux path created between the stator and rotor assemblies as the rotor rotates, the improvement comprising:

means for controlling the available flux coupled between the rotor and stator assemblies and including coil means to which a d.c. current is supplies;

magnet means mounted adjacent to the rotor and rotatable therewith; and, means for mounting the magnet means adjacent to the rotor for the magnet means to rotate in synchronism with the rotor, the current supplied to the coil means controlling the flux coupled to the rotor, and the mounting means partially defining a flux path for the resultant flux, the rotor assembly comprising of a plurality of rotor laminations stacked together and defining the rotor poles, and the magnet means comprising a plurality of magnets extending the length of the lamination stack and positioned adjacent an outer surface of one pole of each set of rotor poles for the magnets to magnetically attach to the respective rotor poles, there being a magnet for one pole of each set of rotor poles with each magnet magnetically attaching to an associated rotor pole to produce a consequent rotor assembly in which all the poles formed by the stack of rotor laminations are the same type of pole; e.g., a south pole.

2. The improvement of claim 1 wherein the outer surface of each pole is arcuate, and each magnet comprises a curved magnet subtending an arc corresponding to that subtended by the respective outer face of its associated pole, attachment of a magnet to its respective poles making that pole the same type of pole as the other pole in the set of poles.

3. The improvement of claim 2 wherein the mounting means includes an annular housing sized to fit over the rotor shaft adjacent one end of the rotor lamination stack, the housing having an inner wall whose outer diameter is greater than the diameter of the rotor shaft for an air gap to be formed between the housing and the rotor shaft.

4. The improvement of claim 3 wherein said coil means comprises an annular coil positioned in said housing and used to produce a second and diverted flux path through the rotor assembly, said diverted flux path crossing the air gap formed between the housing and the rotor shaft.

5. The improvement of claim 4 wherein mounting means further includes an annular ring sized to fit over said housing with an air gap being formed between said ring and said housing, the ring including a plurality of fingers spaced about and extending from the ring longitudinally of, and parallel to, the rotor shaft, the number of fingers corresponding to the number of magnets.

6. The improvement of claim 5 wherein the magnets are secured to an inner surface of the fingers so to be positioned adjacent the outer surfaces of the poles whereby the magnets are magnetically attached to the rotor poles with the fingers supporting the ring in its spaced relationship to the coil housing for the air gap between the ring and housing to form part of a diverted flux path which extends from coil and coil housing, across the air gap between the coil housing and rotor shaft, through the rotor shaft and rotor laminations, the magnets, the fingers attached to the magnets, the ring from which the fingers extend, and across the air gap between the ring and coil housing.

7. The improvement of claim 5 wherein the coil housing, and ring and fingers are formed of a permeable, powdered metal pressed to an appropriate size and shape.

8. A brushless, permanent magnet dynamo-electric machine comprising:

a stator assembly including a stator having a plurality of inwardly salient stator poles;

a rotor assembly including a rotor mounted on a rotor shaft for rotation with respect to the stator assembly, the rotor being formed of a stack of rotor laminations defining a plurality of outwardly salient rotor poles, there being an air gap between the respective rotor and stator poles when the poles are aligned; and, means for controlling the available flux coupled between the rotor and stator assemblies and including coil means to which a d.c. current is supplied, magnet means mounted adjacent to the rotor and including a plurality of magnets extending the length of the lamination stack and positioned adjacent an outer face of one pole of each set of rotor poles for the magnet to magnetically attach to the poles, means for mounting the coil means adjacent the rotor shaft and including an annular housing sized to fit over the rotor shaft adjacent one end of the rotor lamination stack, the housing having an inner wall whose outer diameter is greater than the diameter of the rotor shaft for an air gap to be formed between the housing and the rotor shaft and means for attaching the magnet means to the rotor for the magnet means to rotate in synchronism with the rotor and including an annular ring sized to fit over said housing with an air gap being formed between said ring and said housing, the ring including a plurality of fingers spaced about and extending from the ring longitudinally of, and parallel to the rotor shaft, the number of fingers corresponding to the number of magnets, the magnets being secured to respective inner surfaces of said fingers so to be positioned adjacent said respective outer faces of said poles and magnetically attached thereto, said fingers supporting said magnets in their attached positions against the centrifugal forces produced by said machine when it is running, the stator assembly and rotor assembly together providing one flux path for the motor, and coil means, magnet means, mounting means and attaching means defining a flux diversion path whereby current supplied to the coil means controls the amount of flux coupled between the rotor assembly and stator assembly by controlling the flux in the flux diversion path.

9. The dynamo-electric machine of claim 8 wherein said outer faces of each said pole is arcuate, and each magnet comprising a curved magnet subtending an arc corresponding to the subtended by the respective outer face of said pole.

10. The dynamo-electric machine of claim 9 wherein said coil means comprises an annular coil positioned in said housing and used to produce a second and diverted flux path through the rotor assembly, said diverted flux path crossing the air gap formed between the housing and the rotor shaft, said coil having respective inner and outer diameters corresponding to the respective diameters of an inner wall and an outer wall of said housing for said coil to be received in said housing.

11. The dynamo-electric machine of claim 10 wherein said mounting means and attaching means are comprised of a permeable, powdered metal pressed to an appropriate size.

12. A brushless, permanent magnet motor comprising:

a stator assembly including a stator having a plurality of inwardly salient stator poles;

a rotor assembly including a rotor mounted on a rotor shaft for rotation with respect to the stator assembly, the rotor having a plurality of outwardly salient rotor poles, there being an air gap between the respective rotor and stator poles when the poles are aligned, the rotor assembly comprises a plurality of rotor laminations stacked together and defining the rotor poles;

a coil to which a d.c. current is supplied and a housing in which the coil is received, the housing being sized to fit about the rotor shaft adjacent one end of the rotor lamination stack, the housing having an inner wall whose outer diameter is greater than the diameter of the rotor shaft for an air gap to be formed between the housing and the rotor shaft; and, magnet means mounted adjacent to the rotor and means for attaching the magnet means to the rotor for the magnet means to rotate in synchronism with the rotor, the magnet means including a plurality of magnets extending the length of the lamination stack and positioned adjacent an outer face of one pole of each set of rotor poles for the magnets to magnetically attach to the poles, and said magnet attaching means including an annular ring sized to fit over said housing with an air gap being formed between said ring and said housing, the ring including a plurality of fingers spaced about and extending from the ring longitudinally of, and parallel to, the rotor shaft, the number of fingers corresponding to the number of magnets, the magnets being secured to respective inner surfaces of said fingers so to be positioned adjacent said respective outer faces of said poles and magnetically attach thereto, said fingers supporting said magnets in their attached positions against the centrifugal forces produced by said machine when it is running, whereby the stator assembly and rotor assembly together provide a first flux path for the motor with the flux path extending across the first said air gap, and the coil, coil housing, magnets, and attaching means for the magnets define a second and flux diversion path which includes the second and third said air gaps, the current supplied to the coil controlling the amount of flux coupled between the rotor assembly and stator assembly by controlling the amount of flux in the flux diversion path.

13. A method for controlling the available flux coupled between the rotor and stator assemblies of a dynamo-electric machine, the rotor assembly including a rotor mounted on a rotor shaft for rotation with respect to the stator assembly the rotor assembly being comprised of a plurality of rotor laminations stacked together and defining the rotor poles, and the stator assembly having a plurality of inwardly salient stator poles and the rotor having a plurality of outwardly salient rotor poles, there being an air gap between the respective rotor and stator poles when the poles are aligned, the method comprising:

magnetically attaching magnet means to the rotor poles, the magnet means having an associated attachment means which is suspended about the rotor shaft for the magnet means and the attachment means to turn in synchronism with the rotor attaching the magnet means to the rotor poles including positioning a magnet adjacent an outer surface of one pole of a set of rotor poles, each magnet extending the length of the lamination stack, the outer surface of each pole being arcuate, and each magnet comprising a curved magnet subtending an arc corresponding to that subtended by the respective outer surface of a pole;

mounting a stationary coil means about the rotor shaft, the coil means including a coil housing which magnetically couples with the magnet means and its attachment means and the rotor and rotor shaft to define an auxiliary flux path for the machine through which flux flow rather than through a flux path between the rotor and stator assemblies mounting the coil and the magnets includes installing the coil means in a housing adjacent one end of the rotor laminations and fitting a ring over the housing in a spaced relationship thereto, the ring including fingers to which the magnets are attached whereby the magnetic attachment of the magnets to the rotor poles suspends the ring about the coil means housing; and, flowing a current through the coil means, the magnitude and direction of current determining the flux in each flux path.

14. A method for controlling the available flux coupled between the rotor and stator assemblies of a dynamo-electric machine, the rotor assembly including a rotor mounted on a rotor shaft for rotation with respect to the stator assembly, and the stator assembly having a plurality of inwardly salient rotor poles and the rotor having a plurality of outwardly salient rotor poles, there being an air gap between the respective rotor and stator poles when the poles are aligned, the method comprising:

forming a consequent rotor assembly by installing a mounting means over the rotor shaft, the mounting means having a plurality of magnets supported thereon adjacent rotor poles, the magnets attaching themselves to the rotor poles thereby to suspend the mounting means about the shaft with the magnets turning in synchronism with the rotor;

mounting a coil means adjacent the rotor assembly; and, supplying a d.c. current to the coil means, the coil means comprising a coil and the current supplied to the coil controlling flux coupled to the rotor, the rotor, rotor shaft, magnets, mounting means for the magnets, and the coil defining a flux path for the resultant flux.

\* \* \* \* \*